(12) United States Patent
Harper et al.

(10) Patent No.: US 11,031,966 B2
(45) Date of Patent: Jun. 8, 2021

(54) ULTRASONIC PROXIMITY SENSING FOR SAR MITIGATION

(71) Applicant: Microsoft Technology Licensing, LLC, Redmond, WA (US)

(72) Inventors: Marc Harper, Snohomish, WA (US); Christopher Michael Forrester, Kirkland, WA (US); Christian Lorenz, Waterloo (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/390,893

(22) Filed: Apr. 22, 2019

(65) Prior Publication Data

US 2019/0341955 A1 Nov. 7, 2019

Related U.S. Application Data

(60) Provisional application No. 62/666,972, filed on May 4, 2018.

(51) Int. Cl.
*H04B 1/3827* (2015.01)
*H01Q 1/24* (2006.01)
(Continued)

(52) U.S. Cl.
CPC .......... *H04B 1/3838* (2013.01); *H01Q 1/243* (2013.01); *H01Q 13/106* (2013.01);
(Continued)

(58) Field of Classification Search
None
See application file for complete search history.

(56) References Cited

U.S. PATENT DOCUMENTS 9,602,919 B2 3/2017 Caballero et al.
9,733,720 B2 8/2017 Kavli et al.
(Continued)

FOREIGN PATENT DOCUMENTS

GB 2558768 A 7/2018
WO 2017090936 A1 6/2017

OTHER PUBLICATIONS

"Ultrasonic MEMS Sensor SPM0404UD5", Retrieved from: https://www.digikey.in/en/articles/techzone/2011/may/ultrasonic-mems-sensor-spm0404ud5, May 6, 2011, 05 Pages.
(Continued)

*Primary Examiner* — Crystal L Hammond
(74) *Attorney, Agent, or Firm* — Holzer Patel Drennan

(57) ABSTRACT

The disclosed technology provides a computing device with a slot antenna assembly including a slot formed in a metal exterior surface of a computing device case; an acoustic transceiver positioned to transmit an acoustic wave out through the slot and to receive a reflected portion of the acoustic wave in through the slot when the acoustic wave is reflected by an object; a proximity detector coupled to the acoustic transceiver that determines a physical separation between the object and the slot antenna based on a temporal separation between transmission of the acoustic wave and receipt of the reflected portion of the acoustic wave; and a transmission power controller that adjusts transmission power of the slot antenna based on the determined physical separation.

26 Claims, 6 Drawing Sheets

(51) Int. Cl.
*H01Q 19/02* (2006.01)
*H01Q 13/10* (2006.01)
*H04R 19/04* (2006.01)

(52) U.S. Cl.
CPC .......... *H01Q 19/021* (2013.01); *H04R 19/04* (2013.01); *H04R 2499/11* (2013.01)

(56) References Cited

U.S. PATENT DOCUMENTS

| | | |
|---|---|---|
| 9,742,459 B2 | 8/2017 | Ayala Vazquez et al. |
| 9,893,427 B2* | 2/2018 | Pajona .................... H01Q 9/36 |
| 9,924,288 B2 | 3/2018 | Cagdaser et al. |
| 2008/0051165 A1 | 2/2008 | Burgan et al. |
| 2009/0028001 A1* | 1/2009 | Andle .................... G01D 5/48 367/87 |
| 2011/0003614 A1 | 1/2011 | Langereis et al. |
| 2015/0200444 A1* | 7/2015 | Mercer .................... H01Q 1/24 343/702 |
| 2016/0090293 A1 | 3/2016 | Oliaei |
| 2017/0064457 A1 | 3/2017 | Kupershmidt et al. |

OTHER PUBLICATIONS

"International Search Report and Written Opinion Issued in PCT Application No. PCT/US2019/028760", dated Jul. 29, 2019, 11 Pages.

* cited by examiner

ULTRASONIC PROXIMITY SENSING FOR SAR MITIGATION

CROSS-REFERENCE TO RELATED APPLICATIONS

The present application claims priority to U.S. Provisional Patent Application 62/666,972 entitled "ULTRASONIC PROXIMITY SENSING FOR SAR MITIGATION" and filed May 4, 2018, which is specifically incorporated herein by reference for all that is discloses and teaches.

BACKGROUND

In some jurisdictions, specific absorption rate (SAR) standards are in place that impose maximum energy absorption limits on electronic device manufacturers. These standards impose restrictions on the amount of electromagnetic radiation that may be emitted at any particular point within a given distance of a transmitting radio frequency (RF) antenna. Particular attention is given to radiation limits at distances within a few centimeters from the device (e.g., 0-3 centimeters), where users are likely to place a human body part near the transmitting antenna. To comply with SAR standards, many devices are equipped with proximity sensors and circuitry for reducing transmitted carrier signal strength when a dielectric body (e.g., a human body part) is detected in the proximity of the transmitter.

SUMMARY

In at least one implementation, the disclosed technology provides a computing device that includes a slot antenna. The slot antenna includes a slot formed in a metal exterior surface of the computing device case. An acoustic transceiver is positioned within the computing device to transmit an acoustic wave out through the slot and to receive a reflected portion of the acoustic wave in through the slot when the acoustic wave is reflected by a nearby object. A proximity detector coupled to the acoustic transceiver determines a physical separation between the object and the slot antenna based on a temporal separation between transmission of the acoustic wave and receipt of the reflected portion of the acoustic wave. Based on the determined physical separation between the slot antenna and the object, a transmission power controller adjusts transmission power of the slot antenna This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
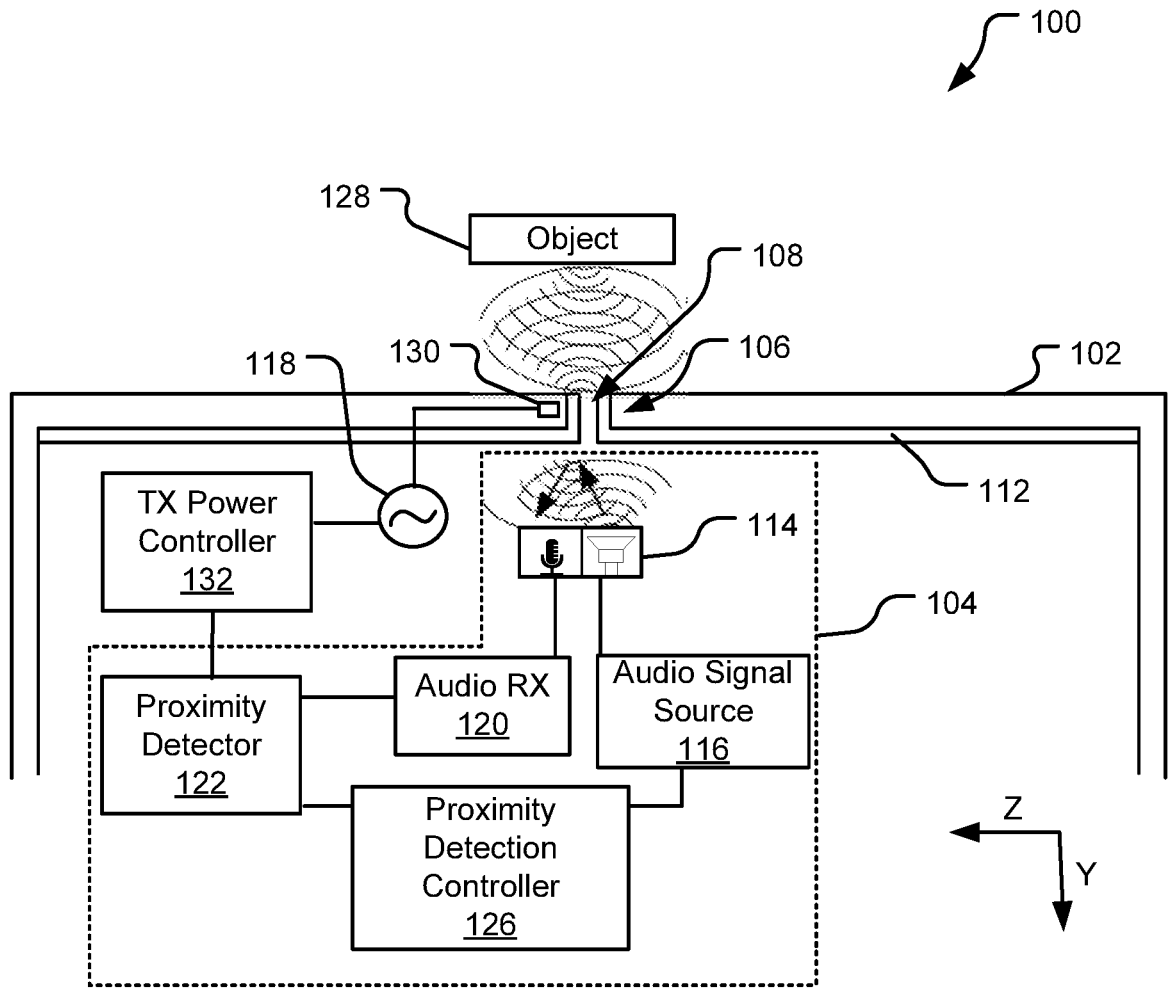
FIG. 1 illustrates a schematic of an exemplary computing device employing ultrasonic proximity sensing for mitigating a specific absorption rate (SAR) of emissions from one or more slot antennas.

Current proximity sensing techniques introduce undesirable technical and design constraints, including undesirable shielding and size limitations as device dimensions decrease. Current manufacturing trends toward smaller, thinner mobile devices have driven a corresponding decrease in device antenna size. However, smaller antennas tend to drive higher emissions in the near-field, amplifying the amount of energy that may be absorbed by human tissue. This increase in near-field emissions can, at times, increase the magnitude of emission reductions needed to maintain continuous compliance with applicable specific absorption prate (SAR) regulations. While capacitive-sensing proximity sensors are adequate in some devices, the increase in near-field emissions of current antennas designs drives requirements for even larger capacitive pads than in previous designs, and design placement options are further limited by the fact that capacitive sensors can inadvertently shield antenna emissions.

The implementations disclosed herein provide antenna assembly solutions that utilize ultrasonic proximity sensing components strategically placed to consume a lesser amount of surface real estate on a device exterior than existing proximity sensing solutions. This is accomplished, in part, by leveraging existing antenna features also serve functions of a device's proximity sensing system. In one implementation, an antenna assembly includes a slot antenna and a proximity sensor that includes an acoustic transceiver. In one implementation, the acoustic transceiver utilizes the slot in the slot antenna as a sound channel for transmission of outgoing sound waves and for receipt of sound waves reflected off a nearby object.

Unlike capacitive pads in capacitive-based proximity sensing systems, ultrasonic proximity sensing techniques do not introduce the potential to inadvertently shield outgoing RF of a device's antennas. Consequently, the transmitting and receiving components of an ultrasonic proximity sensor can be placed in much closer proximity to device antennas than capacitive-based proximity sensor components.

In one implementation of the disclosed technology, an aperture is located proximate to the slot of a slot antenna and is sized large enough to permit output of an ultrasonic signal (e.g., from a speaker) and/or input (e.g., to a microphone). For instance, the slot of the slot antenna may contain a dielectric material with its own aperture large enough to permit output of an ultrasonic signal from an audio signal source positioned and aligned relative to the aperture. In some implementations, multiple such apertures can collectively form a beam of sound waves that may be directed or steered by the size and orientation of the apertures. When sound waves pass through the aperture and reflect of a nearby object, a time-of-flight (TOF) can be calculated for the reflected wave and used to accurately calculate distance to the object. The above-described co-location of the audio transmitter, audio receiver, and device antenna provide the proximity sensing system with a more compact design as well as a more accurate determination of distance between an object and the device antenna than capacitive-based approaches.

Co-location of a speaker, microphone, and antenna allow the proximity sensor to accurately determine the distance of the object from the slot antenna FIG. 1 illustrates a schematic of an exemplary computing device 100 employing ultrasonic proximity sensing to mitigate human absorption of electromagnetic waves. An ultrasonic audio signal operates at frequencies higher than the upper audible limit of human hearing. This upper audible limit varies from person to person and is approximately 20 kilohertz (20,000 hertz) in healthy young adults. Typically, ultrasonic devices operate with frequencies from 20 kHz up to several gigahertz, although 100 kHz is a more typical upper limit of commercial devices. In the described technology, ultrasonic proximity sensing may be employed to detect proximity of an object (such as a human body part) and, in response to such detection, to adjust transmission power of a slot antenna to satisfy specific absorption rate (SAR) standards.

The computing device 100 is enclosed, at least partially, in an exterior metallic case 102 and an ultrasonic proximity sensing circuit 104 is enclosed in the exterior metallic case 102 as part of the computing device 100. The exterior metallic case 102 represents a potential type of case for the computing device 100 that may take advantage of the described ultrasonic proximity sensing, although the described technology may also be used in non-metallic cases to assist in SAR mitigation.

Additionally, the computing device 100 of FIG. 1 includes a slot antenna 106 that includes a radiating slot formed by conductive edges of the exterior metallic case 102 surrounding a dielectric material 112. Although other implementations may employ different feed structures including capacitive or parasitic, the slot antenna 106 includes an antenna signal source 118 providing a direct feed 130 to an edge of the slot of the slot antenna 106.

An aperture 108 is located proximate to the slot and is sized large enough to permit output of an ultrasonic signal (e.g., from a speaker) and/or input (e.g., to a microphone). In FIG. 1, the aperture 108 passes through the radiating slot of the antenna 106 (e.g., the aperture 108 is a through-hole passing through the dielectric material 112). In other implementations, the aperture 108 is formed through the exterior metallic casing rather than the dielectric material 112, such as in a metallic region that is adjacent the edge of the slot. Although filled with the dielectric material 112, the radiating slot of the slot antenna 106 includes at least one small aperture 108 through which an ultrasonic signal may be output (e.g., from a speaker) and/or input (e.g., to a microphone). In one implementation, the dielectric 112 is a plastic insert. In other implementations, the dielectric 112 is air or other dielectric materials (e.g., glass, ceramics).

The aperture 108 is positioned in proximity to the radiating edges of the slot antenna 106 (within a few millimeters of the edges of the slot) to allow the proximity sensing to occur in association with the transmission operation of the slot antenna 106. In the illustrated implementation, an audio component 114, in the form of a microelectronic circuit chip, includes a speaker and microphone pair, although other implementations may separate the microphone and speaker into different chips or integrate the input and output into a single mechanism that performs both a speaker function and a microphone function. In one implementation, one or both of the speaker and microphone are in the form of micro-electromechanical system (MEMS) components, although other speaker and microphone technologies may be employed. The audio component 114 may be one of a set or array of ultrasonic audio components positioned proximate to a radiating element of an antenna of the computing device 100.

In a proximity sensing operation, the audio component 114 receives an audio signal from an audio signal source 116 and outputs an ultrasonic audio signal through the aperture 108 to the exterior of the exterior metallic case 102. In one implementation, the audio signal source 116 is positioned in alignment and proximate to the aperture 108 (e.g., within 1 mm, within 2 mm, within 3 mm) to transmit an acoustic wave out through the aperture and to receive a reflected portion of the acoustic wave through the aperture, responsive to reflection of the acoustic wave by an object. In some implementations, the alignment between the audio signal source 116 and the aperture 108 is an centered axial alignment, although other alignments may be offset from the centers and/or in a non-parallel alignment between a primary plane of the aperture and a top surface of the audio signal source 116. In some implementations, the slot contains a dielectric material with its own aperture, and the audio signal source 116 is positioned and aligned relative to the aperture in this material. In other implementations, particularly with larger slots, multiple audio signal sources may be aligned and positioned relative to a single slot.

If an object at the exterior of the exterior metallic case 102, such as the object 128, is in close proximity (e.g., within a few centimeters), the output ultrasonic audio signal reflects off the object 128, passes back through the aperture 108, and is received by the microphone of the audio component 114. The reflected ultrasonic audio signal is processed by a reflected audio receiver (audio RX 120) and is passed to a proximity detector 122, which utilizes calculations based on the co-location of the microphone, speaker, and slot antenna 106 to determine the distance between the object 128 and the slot antenna 106. In one implementation, the delay between the output time of the output ultrasonic audio signal and the receive time of the received ultrasonic audio signal (e.g., time of flight (TOF) value) represents the distance to the object 128 from which the signal is reflected. The smaller the TOF value, the closer the object.

If the proximity detector 122 determines that the TOF value satisfies a proximity condition (e.g., is small enough to represent that an object is close enough to the slot antenna 106 to warrant a transmission power adjustment), the proximity detector 122 signals a transmission power controller 124 to adjust the power provided to the slot antenna 106 from the antenna signal source 118.

The proximity detector 122 and the audio signal source 116 are controlled by a proximity detection controller 126 and, in some implementations, a proximity detection driver and/or a SAR mitigation driver. For example, the proximity detection controller 126 can turn on and off the ultrasonic proximity sensing components, adjust their parameters (e.g., frequency, encoding, timing, power consumption, range of proximity sensing). In various implementations, the timing of the output ultrasonic audio signals may be modulated or encoded to allow the proximity detector 122 to distinguish between individual output ultrasonic audio signals in order to correctly calculate the TOF value using the right pair of input and output signals. The proximity detection controller 122, for example, can communicate audio signal output times to the proximity detector 122, so that the proximity detector 122 can determine the TOF value based on the corresponding reflected ultrasonic audio signal receive time.

The ultrasonic proximity sensing may be used to distinguish between objects that implicate SAR mitigation standards (e.g., a human body part) and objects that do not (e.g., a tabletop). In one implementation, the ultrasonic proximity sensing is combined with one or more other sensing functionalities (e.g., IR sensor or RGB cameras) to assist in a type of "human detection" feature. For example, an IR sensor may be used to determine whether the object causing the proximity reflection of ultrasound waves satisfies a temperature profile of a human, as opposed to that of a non-human object (e.g., a hot surface of a tabletop heated by the sun).

The ultrasonic audio signal output from the aperture 108 can form a beam of sound waves that may be directed or steered by the size and orientation of a sound channel formed by the aperture in the exterior metallic case 102. In FIG. 1, the channel for the aperture through the exterior metallic case 102 is shown as orthogonal to the surface of the exterior metallic case 102. In other implementations, however, such channels through the exterior metallic case 102 may be non-orthogonal to the outer surfaces of the device 100 and/or shaped in a variety of ways. Arrays of such apertures and audio components may be positioned along surfaces and edges of the exterior metallic case 102 to allow the temporal scanning of proximity sensing sound beams along such surfaces or edges.

Figure 2:
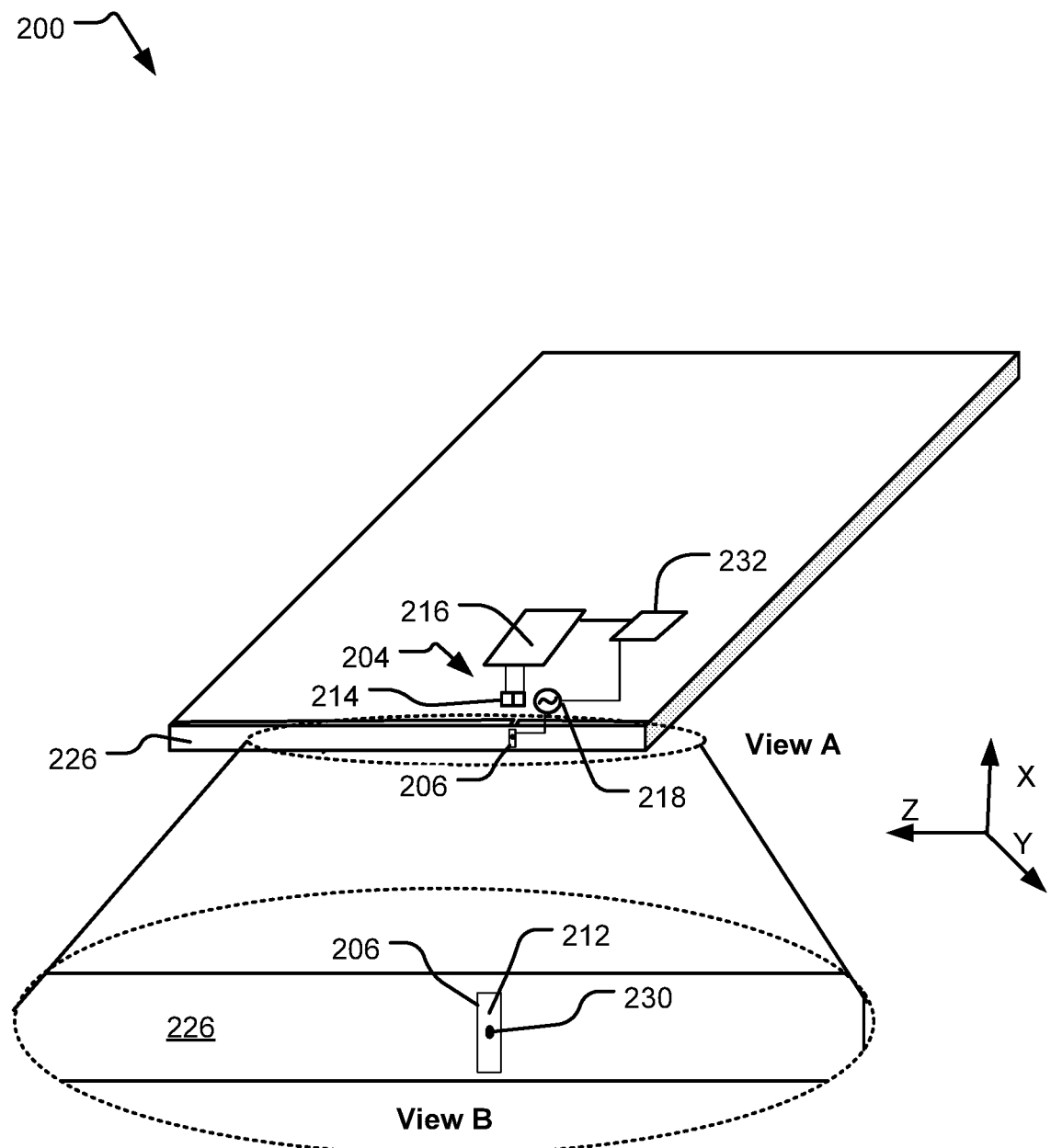
FIG. 2 illustrates a perspective view of another example electronic computing device employing ultrasonic proximity detection for mitigating a specific absorption rate (SAR) of emissions from one or more slot antennas.

FIG. 2 illustrates a perspective view of an example electronic computing device 200 employing ultrasonic proximity detection for mitigating a specific absorption rate (SAR) of emissions from one or more slot antennas. In one implementation, the computing device 200 is the same as the computing device shown in the cross-sectional view of FIG. 1. By example and without limitation, the computing device 200 is shown to be a tablet or mobile phone. In other implementations, the computing device 200 is any electronic device with wireless communication capability. The computing device 200 includes an exterior metallic case 202 with a side surface 226 (shown in greater detail in View B) including a slot 206 formed in the metallic material. Edges of the slot 206 are coupled to a feed structure 218, causing the slot 206 to radiate as a slot antenna.

The slot 206 is filled with a dielectric material 212 with at least one aperture 230 through which an ultrasonic signal may be output from and input to an acoustic transceiver 214 included with an ultrasonic proximity sensing circuit 204 that is encased by the exterior metallic case 202. For simplicity, FIG. 2 illustrates various components of the proximity sensing circuit 204 as proximity sense circuitry 216, which may be understood as including at least an audio signal source feeding a speaker of the acoustic transceiver 214, an audio receiver that receives input from a microphone of the acoustic transceiver 214, a proximity detector that receives input from the audio receiver and audio signal source, and a control unit that selectively toggles power to the audio signal source and adjusts one or more respective audio parameters (e.g., frequency, encoding, timing, power consumption, range of proximity sensing). An exemplary arrangement of such components relative to one another is illustrated with respect to FIG. 1, above.

A transmission power controller 232 receives inputs from the proximity sensing circuit 204 and, based on the inputs, selectively adjusts power of a feed signal provided by the feed structure 218. In one implementation, a proximity detector of the proximity sense circuitry 216 provides the transmission power controller 232 with a signal indicative of a determined distance between the slot 206 and an adjacent object detected in proximity of the computing device 200. In one implementation, the transmission power controller 232 determines a maximum SAR-compliant power level associated with the object distance and lowers the transmission power to at or below the determined maximum when the current transmission power exceeds such value. For example, the transmission power controller 232 may determine, based on a signal received from the proximity sensing circuit 204, that the object has been detected at a distance of 2 cm from the slot antenna 206. The transmission power controller 232 accesses a table to determine a maximum emission power that ensures SAR compliance at a distance of 2 cm and lowers the transmission power of the slot antenna 206 to at or below the determined maximum for a predetermined period of time.

In one implementation, the transmission power controller 232 implements logic to control the slot antenna 206 to radiate at the maximum power that is SAR-compliant (e.g., based on the detected distance to the object) at all times. Other aspects of the computing system 200 not described specifically with respect to FIG. 2 may be the same or similar to those described above with respect to FIG. 1.

Figure 3:
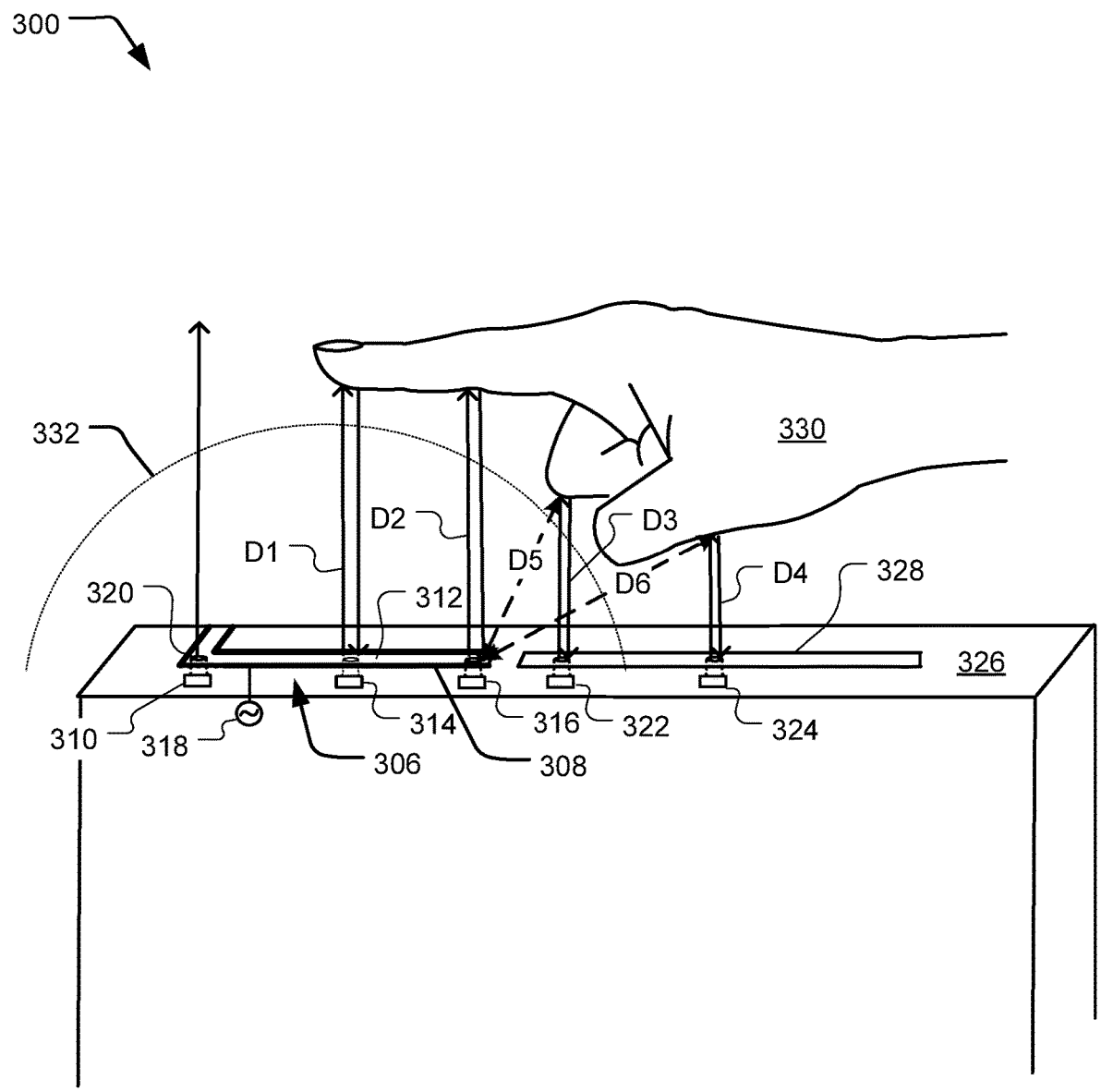
FIG. 3 illustrates another exemplary electronic computing device employing ultrasonic proximity detection for SAR mitigation.

FIG. 3 illustrates another exemplary electronic computing device 300 employing ultrasonic proximity detection for SAR mitigation. The computing device 300 includes an exterior metallic case 302 with a side surface 326 including a slot antenna 306. The slot antenna 306 is includes an L-shaped cut-out (slot) 308 formed in the metallic material of the side surface. Edges of the L-shaped cut-out 306 are fed by a feed structure 318, causing the slot to radiate at a target frequency. The L-shaped cut-out 306 is filled with a dielectric 312.

Ultrasonic audio transceivers 310, 314, 316 (e.g., MEMs components) are embedded within the computing device 300, each with input components (e.g., a microphone) and output components (e.g., a transmitter) in-line below a corresponding aperture (e.g., an aperture 320) formed in the dielectric 312, which is large enough to permit transmission an ultrasonic audio signal.

In addition to the L-shaped cutout 308 of the slot antenna 306, the side surface 326 includes a secondary slot 328, which may be filed with a dielectric including small apertures that are each in-line with an additional underlying audio transceiver 322 and 324. Unlike the L-shaped cutout 308, the secondary slot 328 is not fed by an RF signal and thus does not radiate as a slot antenna. Rather, the secondary slot 328 serves the purpose of expanding a field of view of a proximity sensing system of the electronic device 300. In other implementations, additional audio transceivers may be positioned to collect proximity data at a variety of other locations in addition to or in lieu of those shown, including locations on surfaces from the slot antenna 306 (e.g., side surfaces of the electronic device).

Collectively, the audio transceivers 310, 314, 316, 322, and 324 form an array for which audio signal transmission by an audio signal source 334 is selectively controlled by a proximity detection controller (not shown). According to one implementation, each of the audio transceivers 310, 314, 316, 322, and 324 is coupled to a separate audio signal feed for which power is independently controllable (e.g., to toggle on/off) by the proximity detection controller.

For simplicity of illustration, the ultrasonic beams in FIG. 3 are shown propagating orthogonally away from and back toward the side surface 326. In implementation, the outgoing and reflected audio beams may propagate at a variety of angles. For example, a pin-hole shaped aperture (e.g., aperture 320) may cause the audio beam to propagate a conically-shaped area (e.g., 60 degree cone) between the side surface 326 and the object 330 (e.g., as shown with respect to FIG. 4). In some implementations, the apertures may be angled so as to direct a center of the outgoing ultrasonic beams in a direction that is non-orthogonal relative to the side surface 326. In one implementation, frequency modulated excitation, which is usually referred to as a "chirp", is used to overcome the limitations introduced by the classical pulse-echo technique. In ultrasound, a chirp excitation can be used increase the range by increasing the total transmitted energy using longer pulse durations, while the resolution is controlled by the signal bandwidth.

In various implementations, various beam-shaping and beam steering techniques may be employed to provide targeted coverage of a region of interest, such as a region in close proximity to an antenna component (e.g., within 2 cm) for which more stringent SAR regulations are imposed). Beam steering and beam shaping may be achieved by selectively sizing and shape each aperture (e.g., aperture 320) as well as by targeting placement of the audio transceiver relative to the associated aperture (e.g., placement of the audio transceiver 310 relative to the aperture 320).

When an object 330 (e.g., a human hand) is in close proximity (e.g., a few centimeters) of the side surface 326, transmitted ultrasonic waves are reflected in back down through the apertures (as shown) and received by microphones of the various audio transceivers 310, 314, 316, 322, and 324. Using various techniques (e.g., modulating the timing or encoding output of the signals), the proximity detector may be able to determine a transmission source corresponding to each received reflected signal component and determine a TOF between emission and receipt of each signal component.

In one implementation, the proximity detection controller time-staggers outgoing audio pulses from the different audio transceivers in the array by an amount that allows the system to determine a transmission source corresponding to each received reflected signal. For example, the proximity detection controller may scan through the audio transceivers 310, 314, 316, 322, and 324 in the array to emit a series of time-separated audio pulses from consecutively-positioned transceivers (e.g., from left to right or right to left) to effectively map a series of distances (e.g., D1, D2, D3, and D4) to the object 330. In another implementation, each of the outgoing audio signals is shaped (e.g., encoded with a pattern) that allows a received reflected signal to be accurately matched to its transmission source.

Using either of the above techniques or any suitable alternative, the device 300 may be able to map a proximity of objects relative to the slot antenna 306 within a defined coverage region. In FIG. 3, a SAR boundary 332 represents an exemplary boundary at which SAR regulations provide for a mandatory decrease of device in transmission power of the slot antenna 306. In one implementation, the electronic device 300 includes control circuitry that reduces transmission power of the slot antenna 306 to a defined threshold level responsive to a determination that the object 330 is internal to the SAR boundary 332.

By scanning through the audio transceivers 310, 314, 316, 322, and 324, the proximity controller is able to measure distances D1, D2, D3, and|D4 and to infer the diagonal distances D5 and D6 (e.g., based on basic trigonometric principles and a known separation between each adjacent pair of audio transceivers 310, 314, 316, 322, and 324 in the array). In the illustrated scenario, the proximity detector determines that the object 330 does not cross the SAR boundary 332; consequently, a reduction in transmission power is not needed in this case to ensure compliance with SAR regulations.

In one implementation, the device 300 includes one or more IR sensors and/or RGB sensors to collect data usable to determine whether the object 330 is a human object. For example, an IR sensor located at or near the position of one of the audio transceivers 310, 315, 316, 322, and 324 may sample a temperature profile of the object 330. If the temperature profile corresponds to that of a non-living object, the device 300 may actively adjust transmission power of the slot antenna 306.

Figure 4A:
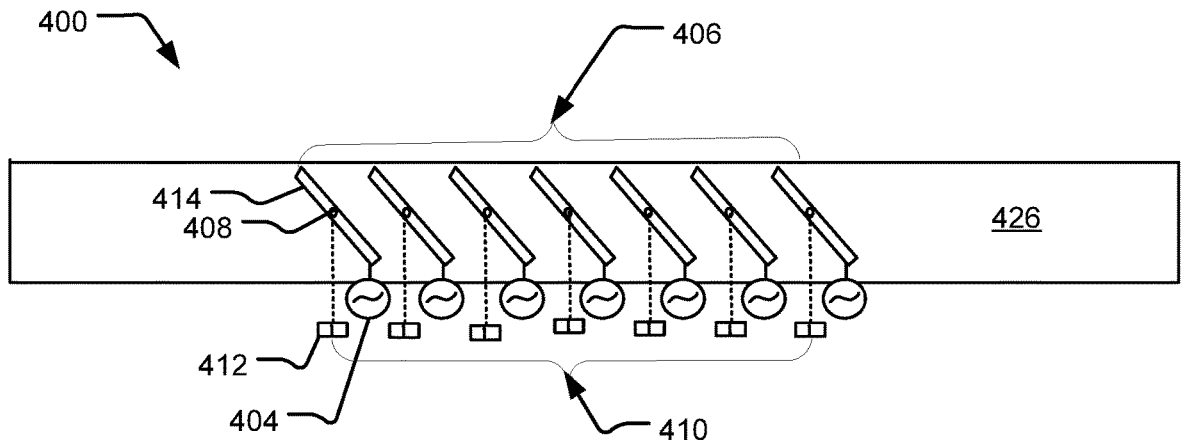
FIG. 4A illustrates a top-down schematic view of another exemplary electronic computing device employing ultrasonic proximity detection for SAR mitigation

FIG. 4A illustrates a top-down schematic view of another exemplary electronic computing device 400 employing ultrasonic proximity detection for SAR mitigation. The computing device 400 includes a metallic outer casing with a side surface 426 including a slot antenna array 406. Although the slot antenna array 406 may be formed in any metallic exterior surface, the side surface 426 corresponds to a narrowest surface of the computing device 400 in one implementation.

Each slot antenna in the slot antenna array 406 includes a slot (e.g., a slot 414) that is filled with a dielectric (e.g., a plastic insert). Edges of each slot are fed by an independent feed source (e.g., a feed source 404) an isolation is effected by targeted spacing between each pair of slot antennas (e.g., spacing slots to be greater apart than the radiating wavelength) and/or by including additional slots between each slot antenna to further enhance isolation. Although not shown, each of the antennas in the slot antenna array 406 may also include a phase controller and separate amplifier. In different implementations, edges of the slot could be fed directly, capacitively, or parasitically. Each slot in the slot antenna array 406 includes at least one aperture (e.g., an aperture 408) in the dielectric filling the slot, and each such aperture is aligned with a corresponding, underlying audio component (e.g., a MEMs audio component 412).

Collectively, the MEMs components form an audio component array 410 that is part of a proximity sensing system. In one implementation, each MEMs component includes both an ultrasonic transmitter (e.g., a speaker) and an ultrasonic receiver (e.g., microphone). In another implementation, one or more of the MEMs components in the audio component array 410 includes an ultrasonic receiver but not an ultrasonic transmitter.

In one implementation, the slot antenna array 406 provides 5G antenna technology by implementing a scanning mode in which the millimeter wave RF field (e.g., 28 GHX or 38 GZ, with a 1 GHZ bandwidth) emitted is scanned along each antenna in the slot antenna array 406. The RF beam field is beam-formed out the edges of the computing device 400 and then scanned back and forth along the array by phase-sweeping. The distance between one end of a slot and the same end of the immediately adjacent slot is, in one implementation, approximately a half a wavelength of the operating frequency.

During operation of the slot antenna array 406, each MEMS component is controlled to emit ultrasonic waves through the corresponding aperture of the associated slot antenna. When the apertures are pin-hole shaped and orthogonal to the surface 426, each MEMs component generates a substantially conical outgoing audio beam, as shown in greater detail with respect to FIG. 4B, below. In various implementations, aperture sizes, aperture shapes, and aperture positions relative to MEMs components may be carefully selected to provide targeted coverage of a predefined proximity sensing region of interest.

During one exemplary proximity sensing operation, a proximity detection controller scans through each MEMs component in the audio component array 410, sequentially emitting time-staggered audio pulses (e.g., from left to right or right to left). By analyzing receipt of pulse reflections corresponding to each pulse, the proximity detection controller can map the TOF of each pulse and map a variety of distances to a nearby object.

Figure 4B:
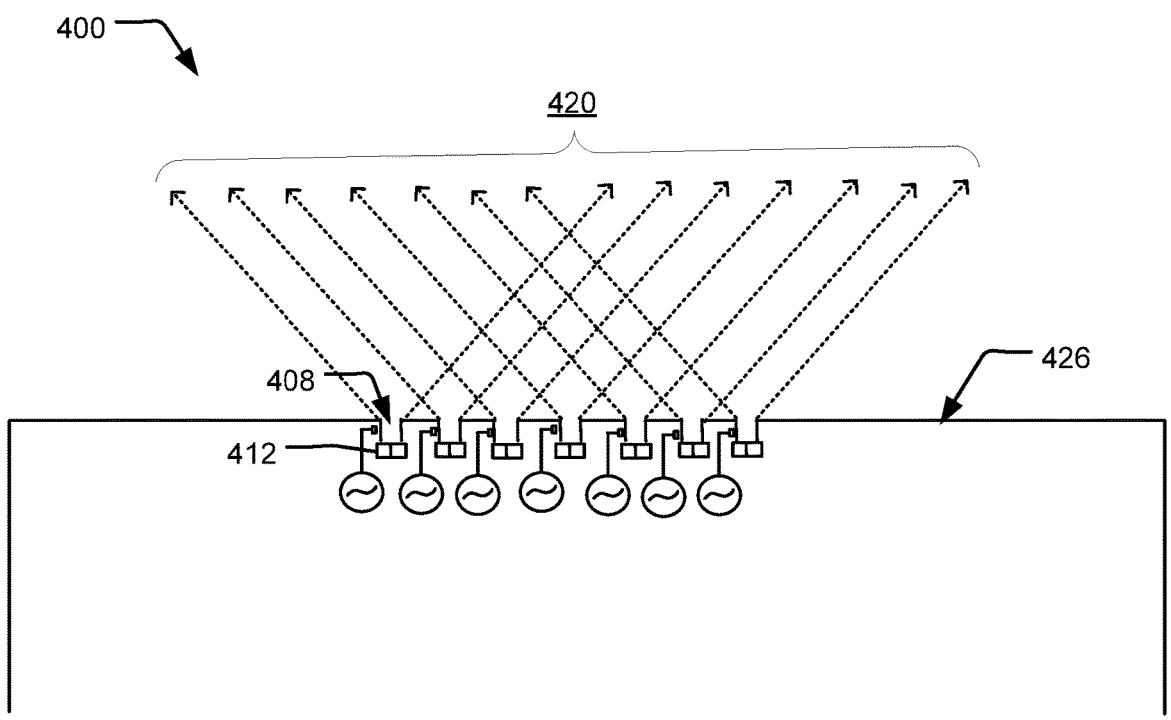
FIG. 4B illustrates a cross-sectional side view of the electronic computing device of FIG. 4A.

FIG. 4B illustrates a cross-sectional side view of the electronic computing device 400. As shown, each slot in the slot antenna array 406 is fed by an independent feed source and includes an aperture (e.g., an aperture 408) through which audio signals may be transmitted and received by a corresponding component of an audio component array 410 (e.g., MEMs audio component 412). In FIG. 4B, dotted lines indicate a field-of-view of each one of the MEMS components, combinable for a total field-of-view 420.

Figure 5:
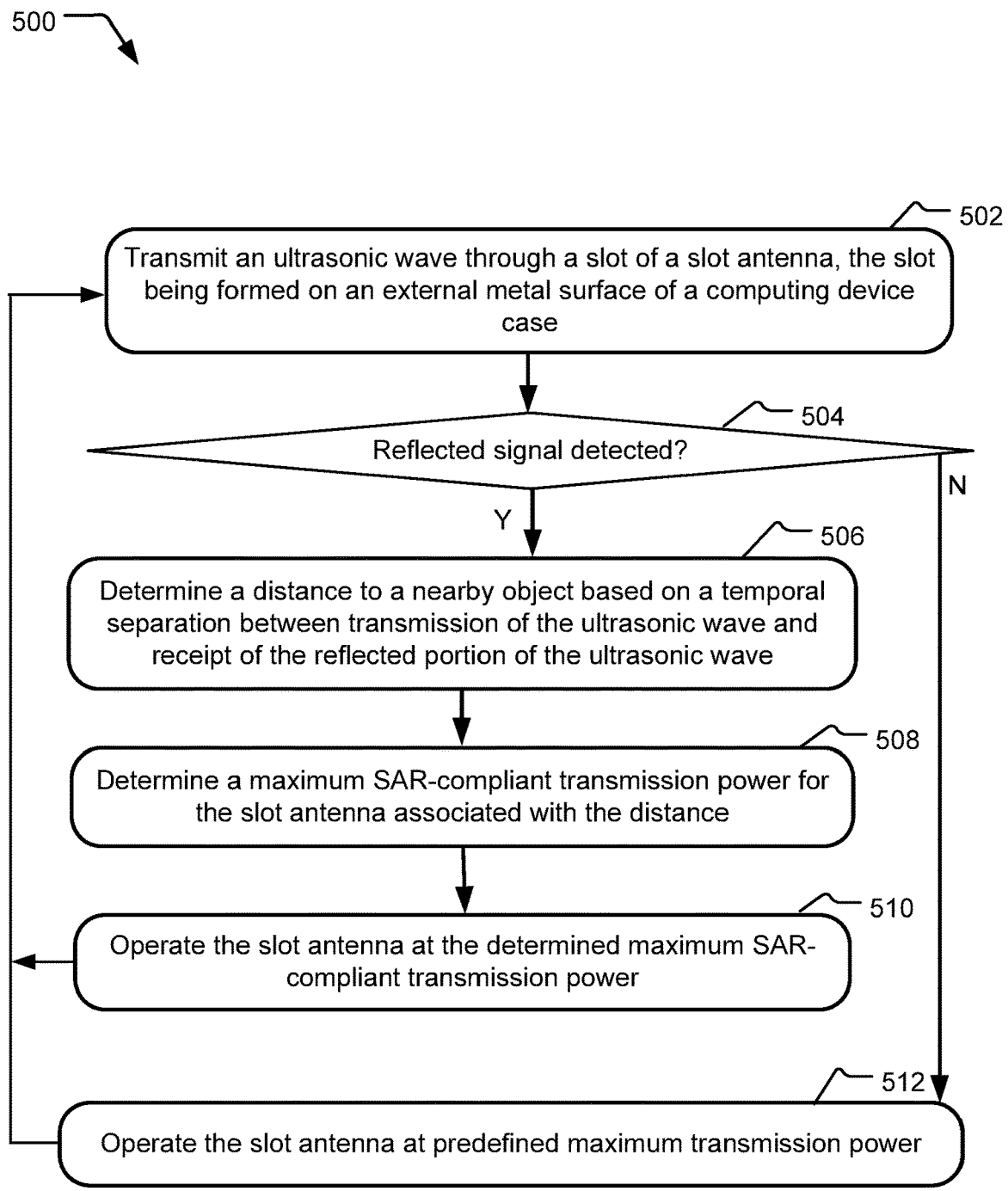
FIG. 5 illustrates example operations for ultrasonic proximity sensing to identify object(s) within a predefined range of a radiating slot antenna.

FIG. 5 illustrates example operations 500 for ultrasonic proximity sensing to identify object(s) within a predefined range of a radiating slot antenna. A transmission operation 502 transmits an ultrasonic wave, emitted by an audio signal source, through an aperture formed within a slot of a slot antenna. In one implementation, the aperture is formed within a dielectric material filling a cut-out (e.g., a slot of the slot antenna) formed in an external metal surface of a computing device case. In different implementations, the aperture may be sized and/or shaped different to affect a desired shaping and steering of the outgoing ultrasonic wave.

A determination operation 504 determines whether a reflected portion of the transmitted ultrasonic wave has been received by one or more audio receivers embedded within the electronic device case. If no reflected signal is received, an antenna control operation 512 operates the slot antenna at a predefined maximum transmission power.

When the determination operation 504 determines that a reflected signal is received by one or more of the embedded audio receivers, a determination operation 506 determines, based on a temporal and/or spatial separation between the outgoing ultrasonic signal and the received reflected signal, a distance to a nearby object that reflected the audio signal. When multiple distances have been computed (e.g., when the reflected signal is received by multiple embedded audio components), the "determined distance" may be the shortest computed distance and/or the distance that represents the closest proximity between the slot antenna and the object.

In one implementation, the reflected audio signal is received at an ultrasonic receiver co-located in tight proximity relative to the audio signal transmission source such that both the outgoing and incoming signals pass through the same aperture in the casing of the computing device. For example, a proximity sensing system may utilize a co-location of an ultrasonic transmitter, ultrasonic receiver, and slot antenna in conjunction with the computed TOF of the signal to determine a relative distance between the slot antenna and an object that reflected the signal.

A determination operation 508 determines a maximum SAR-compliant transmission power associated with the determined distance to the object. If, for example, the object is detected in the range of 2-3 cm, the proximity sensing system may access a stored table to determine a maximum transmission power of the slot antenna that is legally permitted when a human or animal is within 2-3 cm of the slot antenna. An antenna control operation 510 operates the slot antenna at the determine maximum SAR-compliant transmission power, adjusting as necessary (e.g., if the current transmission power is above or below the determined maximum SAR-compliant transmission power).

In some implementations, proximity sensing system of the electronic device uses a secondary type of sensor (e.g., an IR sensor or RGB camera (not shown) to differentiate between living and non-living objects. For example, an IR sensor may capture a temperature profile of the object and the proximity sensing system determines whether the temperature profile corresponds to a human or animal. In another implementation an RGB sensor is used to image the object and the proximity sensing system employs image recognition to determine whether the object corresponds to a human or animal. In cases where the object is determined to be non-living, the slot antenna may be operated at the predetermined maximum transmission power.

Figure 6:
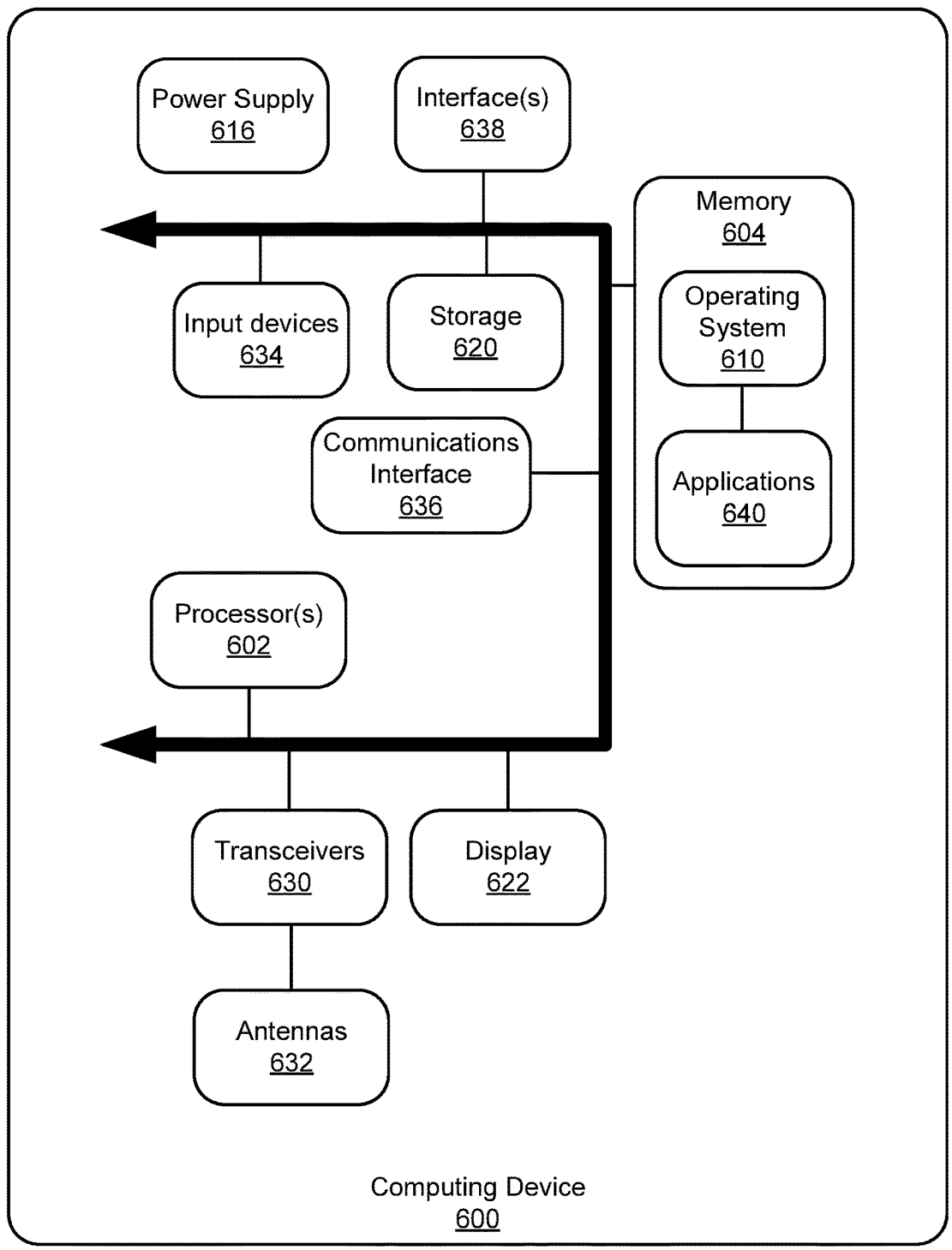
FIG. 6 illustrates an example computing device for use in ultrasonic proximity sensing.

FIG. 6 illustrates an example computing device 600 for use in ultrasonic proximity sensing. The example computing device 600 may be used to detect the proximity of an object with respect to an antenna, such as in the application of SAR mitigation. The computing device 600 may be a personal or enterprise computing device, such as a laptop, mobile device, desktop, tablet, or a server/cloud computing device. The computing device 600 includes one or more processor(s) 602, and a memory 604. The memory 604 generally includes both volatile memory (e.g., RAM) and non-volatile memory (e.g., flash memory). An operating system 610 and one or more applications 640 reside in the memory 604 and are executed by the processor(s) 602.

One or more modules or segments, such as a proximity detection controller, a proximity detection driver and/or a SAR mitigation driver, are loaded into the operating system 610 on the memory 604 and/or storage 620 and executed by the processor(s) 602. Data such as user preferences, encoding parameters, ultrasonic frequency preferences, and hardware configurations, may be stored in the memory 604 or storage 620 and may be retrievable by the processor(s). The storage 620 may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622 such as a touchscreen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example slot antenna assembly includes a slot antenna including a slot formed in a metal exterior surface of a computing device case. An acoustic transceiver is positioned proximate to the slot to transmit an acoustic wave out through the slot and to receive a reflected portion of the acoustic wave through the slot responsive to reflection of the acoustic wave by an object. The slot antenna assembly further incudes a proximity detector and a transmission power controller. The proximity detector is coupled to the acoustic transceiver and determines a physical separation between the object and the slot antenna based on a temporal separation between transmission of the acoustic wave and receipt of the reflected portion of the acoustic wave. The transmission power controller adjusts transmission power of the slot antenna based on the determined physical separation.

In one example slot antenna assembly according to any preceding slot antenna assembly, the acoustic transceiver includes an ultrasonic speaker and an ultrasonic microphone. The slot assembly comprises multiple acoustic receiving components separated along a length of the slot, each configured to transmit an acoustic wave and to receive a reflected portion of the associated transmitted acoustic wave. The proximity detector determines the physical separation between the object and the slot antenna based on a temporal separation between transmission of the acoustic wave and detection of the associated reflected portion of the acoustic wave at two or more of the multiple acoustic receiving components.

In another example slot antenna assembly of any preceding slot antenna assembly, the proximity detector determines a distance to the object based on at least one of a shape and orientation of the slot.

In still another example slot antenna assembly of any preceding slot antenna assembly, the slot antenna further includes an infrared sensor. The transmission power controller adjusts the transmission power of the slot antenna when a measurement collected by the infrared sensor lies within a measurement range corresponding to a human body.

In yet another example slot assembly of any preceding slot antenna assembly, the slot is filled with a dielectric and an aperture is formed in the dielectric.

In still another example slot assembly of any preceding slot antenna assembly, the acoustic transceiver is configured to transmit the acoustic wave through the aperture.

In still another example slot assembly of any preceding slot antenna assembly, the slot antenna further comprises multiple slot antennas each including a slot formed in the metal exterior surface of a computing device case and an array of acoustic transceivers each positioned in proximity of a slot of an associated one of the multiple slot antennas. The slot antenna assembly further comprises a proximity detection controller configured to generate a sequence of time-separated audio pulses by sequentially toggling power to each one of the acoustic transceivers in the array. The proximity detector is configured to determine a transmission source associated with the reflected portion of the acoustic wave based on a timing or encoding of a the emitted acoustic pulses.

An example method disclosed herein includes transmitting an acoustic wave through a slot of a slot antenna formed in a metal exterior of a computing device case; receiving a reflected portion of the acoustic wave back through the slot at an acoustic receiver responsive to reflection of the acoustic wave by an object; determining a physical separation between the slot antenna and the object based on a temporal separation between transmission of the acoustic wave and receipt of the reflected portion of the acoustic wave; and adjusting transmission power of the slot antenna based on the determined physical separation.

An example method of any preceding method disclosed herein further incudes receiving, at each of multiple acoustic receiving components within the computing device case, a different reflected portion of the acoustic wave; and determining the physical separation based on a temporal separation between transmission of the acoustic wave and detection of the reflected portions of the acoustic wave at two or more of the multiple acoustic receiving components.

In another example method of any preceding method, determining the physical separation further comprises determining the physical separation based on at least one of a shape and orientation of the slot.

In yet another example method of any preceding method, the method further comprises determining whether a measurement collected by an infrared sensor lies within a measurement range corresponding to a human body; and responsive to determining that the measurement does lie within the measurement range, adjusting the transmission power of the slot antenna.

In still another example method of any preceding method, the slot is filled with a dielectric and an aperture is formed in the dielectric.

In another example method of any preceding method, transmitting the acoustic wave further comprises transmitting the acoustic wave through the aperture.

In yet another example method of any preceding method, the computing device case includes an array of acoustic transmitters and the method further comprises: generating a sequence of time-separated acoustic pulses by sequentially toggling power to each one of multiple acoustic transmitters in the array; and determining a transmission source associated with the reflected portion of the acoustic wave based on a timing or encoding of the acoustic pulses.

An example memory device disclosed herein encodes computer-executable instructions for executing a computer process comprising: transmitting an acoustic wave through a slot of a slot antenna formed in a metal exterior of a computing device case; detecting a reflected portion of the acoustic wave back through the slot at an acoustic receiver responsive to reflection of the acoustic wave by an object; determining a physical separation between the slot antenna and the object based on a temporal separation between transmission of the acoustic wave and receipt of the reflected portion of the acoustic wave; and adjusting transmission power of the slot antenna based on the determined physical separation.

In another example memory device of any preceding memory device, the computer process further comprises receiving at each of multiple acoustic receiving components within the computing device case a different reflected portion of the acoustic wave; and determining the physical separation based on a temporal separation between transmission of the acoustic wave and detection of the reflected portions of the acoustic wave at two or more of the multiple acoustic receiving components.

In another example memory device of any preceding memory device, the computing device case includes an array of acoustic transmitters. The computer process further comprises generating a sequence of time-separated audio pulses by sequentially toggling power to each one of multiple acoustic transmitters in the array and determining a transmission source associated with the reflected portion of the acoustic wave based on a timing or encoding of a the emitted time-separated acoustic pulses.

In still another example memory device of any preceding memory device the slot is filled with a dielectric and an aperture is formed in the dielectric.

In another example memory device of any preceding memory device, transmitting the acoustic wave through the slot further comprises transmitting the acoustic wave through the aperture.

An example system disclosed herein includes a means for transmitting an acoustic wave through a slot of a slot antenna formed in a metal exterior of a computing device case; a means for receiving a reflected portion of the acoustic wave back through the slot at an acoustic receiver responsive to reflection of the acoustic wave by an object; a means for determining a physical separation between the slot antenna and the object based on a temporal separation between transmission of the acoustic wave and receipt of the reflected portion of the acoustic wave; and a means for adjusting transmission power of the slot antenna based on the determined physical separation.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A slot antenna assembly comprising:
   a slot antenna including a slot;
   an acoustic transceiver positioned proximate to the slot to transmit an acoustic wave out through the slot and to receive a reflected portion of the acoustic wave through the slot responsive to reflection of the acoustic wave by an object; and
   a proximity detector coupled to the acoustic transceiver that determines a physical separation between the object and the slot antenna based on a temporal separation between transmission of the acoustic wave and receipt of the reflected portion of the acoustic wave.

2. The slot antenna assembly of claim 1, wherein the acoustic transceiver includes an ultrasonic speaker and an ultrasonic microphone.

3. The slot antenna assembly of claim 1, further comprising:
   multiple acoustic receiving components separated along a length of the slot, each acoustic receiving component being configured to transmit an acoustic wave and to receive a reflected portion of the associated transmitted acoustic wave, wherein the proximity detector determines the physical separation between the object and the slot antenna based on a temporal separation between transmission of the acoustic wave and detection of the associated reflected portion of the acoustic wave at two or more of the multiple acoustic receiving components.

4. The slot antenna assembly of claim 1, wherein the proximity detector determines a distance to the object based on at least one of a shape and orientation of the slot.

5. The slot antenna assembly of claim 1, wherein the slot is filled with a dielectric and an aperture is formed in the dielectric.

6. The slot antenna assembly of claim 5, wherein the acoustic transceiver is configured to transmit the acoustic wave through the aperture.

7. The slot antenna assembly of claim 1, further comprising:
multiple slot antennas, each slot antenna including a slot; and
an array of acoustic transceivers, each of the acoustic transceivers being positioned in proximity of the slot of an associated one of the multiple slot antennas; and
a proximity detection controller configured to generate a sequence of time-separated acoustic pulses by sequentially toggling power to each of the acoustic transceivers in the array, the proximity detector being configured to determine proximity of a transmission source associated with the reflected portion of the acoustic wave based on a timing or encoding of the generated acoustic pulses.

8. The slot antenna assembly of claim 1, wherein the slot is formed in a metal exterior surface of a computing device case.

9. The slot antenna assembly of claim 1, further comprising:
a transmission power controller that adjusts transmission power of the slot antenna based on the determined physical separation.

10. The slot antenna assembly of claim 9, further comprising:
an infrared sensor, wherein the transmission power controller adjusts the transmission power of the slot antenna when a measurement collected by the infrared sensor lies within a measurement range corresponding to a human body.

11. A method comprising:
transmitting an acoustic wave through a slot of a slot antenna;
receiving a reflected portion of the acoustic wave back through the slot at an acoustic receiver responsive to reflection of the acoustic wave by an object; and
determining a physical separation between the slot antenna and the object based on a temporal separation between transmission of the acoustic wave and receipt of the reflected portion of the acoustic wave.

12. The method of claim 11, further comprising:
receiving, at each of multiple acoustic receiving components, a different reflected portion of the acoustic wave; and
determining the physical separation based on a temporal separation between transmission of the acoustic wave and detection of the reflected portions of the acoustic wave at two or more of the multiple acoustic receiving components.

13. The method of claim 11, wherein determining the physical separation further comprises:
determining the physical separation based on at least one of a shape and orientation of the slot.

14. The method of claim 11 further comprising:
determining whether a measurement collected by an infrared sensor lies within a measurement range corresponding to a human body; and
responsive to determining that the measurement lies within the measurement range, adjusting transmission power of the slot antenna.

15. The method of claim 11, wherein the slot is filled with a dielectric and an aperture is formed in the dielectric.

16. The method of claim 15, wherein transmitting the acoustic wave further comprises transmitting the acoustic wave through the aperture.

17. The method of claim 11, wherein the method further comprises:
generating a sequence of time-separated acoustic pulses by sequentially toggling power to each of multiple acoustic transmitters in an array; and
determining proximity of a transmission source assocated with the reflected portion of the acoustic wave based on a timing or encoding of the time-separated acoustic pulses.

18. The method of claim 11, wherein the slot is formed in a metal exterior surface of a computing device case.

19. The method of claim 11, further comprising:
adjusting transmission power of the slot antenna based on the determined physical separation.

20. One or more memory devices encoding computer-executable instructions for executing a computer process comprising:
transmitting an acoustic wave through a slot of a slot antenna;
detecting a reflected portion of the acoustic wave back through the slot at an acoustic receiver responsive to reflection of the acoustic wave by an object; and
determining a physical separation between the slot antenna and the object based on a temporal separation between transmission of the acoustic wave and receipt of the reflected portion of the acoustic wave.

21. The one or more memory devices of claim 20, wherein the computer process further comprises:
receiving, at each of multiple acoustic receiving components, a different reflected portion of the acoustic wave; and
determining the physical separation based on a temporal separation between transmission of the acoustic wave and detection of the reflected portions of the acoustic wave at two or more of the multiple acoustic receiving components.

22. The one or more memory devices of claim 20, wherein the computer process further comprises:
generating a sequence of time-separated acoustic pulses by sequentially toggling power to each of multiple acoustic transmitters in an array; and
determining a transmission source associated with the reflected portion of the acoustic wave based on a timing or encoding of the generated time-separated acoustic pulses.

23. The one or more memory devices of claim 20, wherein the slot is filled with a dielectric and an aperture is formed in the dielectric.

24. The one or more memory devices of claim 23, wherein transmitting the acoustic wave through the slot further comprises transmitting the acoustic wave through the aperture.

25. The one or more memory devices of claim 20, wherein the slot is formed in a metal exterior surface of a computing device case.

26. The one or more memory devices of claim 20, wherein the computer process further comprises:
adjusting transmission power of the slot antenna based on the determined physical separation.

* * * * *